3,060,101
PROCESS FOR THE 6β-HYDROXYLATION OF STEROIDS WITH MORTIERELLA
Louis I. Feldman, Spring Valley, N.Y., Neil E. Rigler, Ridgewood, N.J., Anthony J. Shay, Pearl River, N.Y., and Barbara Nielsen, Ridgewood, N.J., assignors to American Cyanamid Company, New York, N.Y., a corporation of Maine
No Drawing. Filed Feb. 13, 1961, Ser. No. 88,641
8 Claims. (Cl. 195—51)

This invention relates to the preparation of 6β-hydroxylated steroids of the pregnane series. More particularly, it relates to the microbiological 6β-hydroxylation of steroids of the pregnane series by species of the genus Mortierella.

The use of hydrocortisone as an antiarthritic and in dermatology is well known and widely accepted. Methods of preparing 6β-hydroxylated hydrocortisone and related steroids are therefore desirable.

We have found the process of the present invention can use as starting material practically any steroid of the pregnene series having in the 6-position two hydrogen atoms attached to the carbon atom and in the 9-position a hydrogen atom. The process of the present invention can be illustrated as follows:

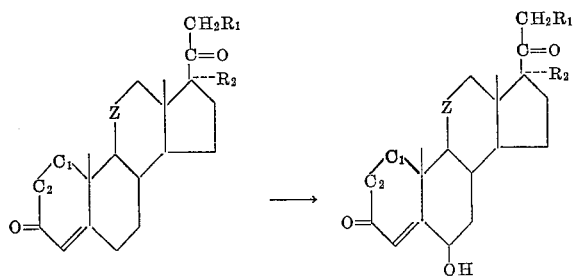

wherein —$C_1$—$C_2$— is a divalent radical selected from the group consisting of —$CH_2$—$CH_2$— and —CH=CH— groups, Z is selected from the group consisting of $H_2C<$, $O=C<$ and

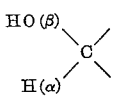

groups and $R_1$ and $R_2$ are selected from the group consisting of hydrogen, hydroxyl and lower alkanoyloxy groups. Among these compounds can be, for example, hydrocortisone, 21-acetoxy-hydrocortisone, cortisone, 21-acetoxy-cortisone, 4-androsten-3,17-dione; 17α-hydroxy-4-androstene-3-one; 4-pregnene-3,20-dione; 21-hydroxy-4-pregnene-3,20-dione; 17α,21-dihydroxy-4-pregnene-3,20-dione and 11β,17α,21-trihydroxy-4-pregnene-3,20-dione and esters thereof.

In carrying out the process of the present invention, species of the genus Mortierella such as *banieri, polycephala, alpina, tuberosa, pusilla, simplex* and *marburgensis* or other species of Mortierella such as *Mortierella zonata* ATCC No. 13,309 are cultivated aerobically in a suitable nutrient medium with a non-halogenated steroid of the pregnane series. *Mortierella zonata* has the following characteristics; culture on potato-dextrose agar spreading rapidly and covering the entire Petri dish in ten days; aerial mycelium white, cottony; up to 4–5 mm. high, forming concentric zonations; sporophores simple, rarely showing branching; 75–200μ x 4–5μ at base, 2–3μ at tips. Stylospores produced at the terminus of the sporophores; spores globose, 8–16μ in diameter; walls appearing slightly roughened; cultures on cornmeal agar growing thinly (less than 1 mm. high) with wide submerged advancing colony margin. Colonies 6–7 cm. in diameter in ten days; zonate and feathery appearing; sporiferous structures produced mostly in central zones, and more abundantly than on potato-dextrose agar, but with similar dimensions. These species are described in detail by J. C. Gilman, "A Manual of Soil Fungi," 2nd edition, Iowa State College Press, 1957; also by C. W. Hesseltine unpublished thesis, University of Wisconsin, 1950. Fungi of the class Phycomycetes, order Mucorales and the various genuses are available from culture collection agencies such as American Type Culture Collection, Washington, D.C.; Northern Regional Research Laboratories, Peoria, Illinois; The Imperial Institute of Mycology, Kew, England; The Central Bureau voor Schimmel Culture, Baarn, Holland and so forth. During the growth of the organism under favorable conditions, a hydrogen atom in the 6β-position is replaced with a hydroxyl radical.

The exact mechanism of the hydroxylation is obscure, but it is the result of enzymes produced by the organism in the process of the growth. A suitable nutrient medium contains a soluble source of carbon, nitrogen and mineral elements. Sources of carbon include sugars, such as glucose, sucrose, maltose, dextrose, xylose and galactose; also, alcohols, such as glycerol or mannitol; corn starch; organic acids, such as citric acid, malic acid and acetic acid; and various natural products containing carbohydrates such as corn steep liquor, soybean meal, cotton seed meal and many other available materials which have been used heretofore as a source of carbon in fermentation processes. Usually a variety of the above can be employed in the medium with good results.

Suitable sources of nitrogen include some of the above named materials, such as corn steep liquor, soybean meal, cotton seed meal and the like and various other substances, such as beef extract, casein, yeast, enzymatically digested proteins, and degradation products, including peptones, amino acids and many other available proteinaceous materials which have been found to be suitable in supporting the growth of fungi. Inorganic sources of nitrogen, including urea, ammonium salts, nitrates and the like may be used in the medium as a source of assimilable nitrogen to provide a favorable growth medium for the organism.

The mineral requirements of fermentation are usually supplied in the crude materials which are often used as sources of carbon and nitrogen or occur in water that is used in the process. However, it is usually advisable to supplement the minerals normally present with added amounts to obtain a maximum growth of Mortierella. Cations and anions which may be desirable in added amounts include sodium, potassium, calcium, magnesium, phosphate, sulphate, chloride, cobalt, manganese and various others. The use of trace elements, such as boron, copper, cobalt, molybdenum and chromium is often desirable.

The growth of the Mortierella fungus takes place under aerobic conditions and aeration in flasks, for example, can be achieved by agitation on a reciprocating or rotary shaker or in bottles or tanks by forcing sterile air through the fermentation mixture. It is desirable that the sterile air be forced through the medium in an amount of from ⅓ to 2 volumes of air per volume of medium per minute. Agitation in the bottles or fermenter tanks is provided by a mechanical impeller. The Mortierella fungus will grow at temperatures between 5° and 45° C., but it is preferable to carry out the process using the same at a temperature of from 15° to 37° C.

To prepare the fermentation medium for bottle fermentation, 1.0 ml. of washed vegetative cell suspension of fungi of the genus Mortierella from a potato dextrose agar slant is used to inoculate 100 ml. of sterile medium containing 2% molasses, 1% corn steep liquor, 1% corn starch and pH adjusted to about 7.0. The fermentation time may vary from about 1 to 144 hours or longer.

A preferred method of adding the substrate is to dissolve the steroid in ethanol, methanol or other water-miscible solvents and add it to the fermentation medium at the desired stage in the process. Although the steroid may precipitate from solution when so added, it is dispersed throughout the medium as a fine suspension and becomes readily available to the organism for hydroxylation. The amount of steroid added to the fermentation may vary considerably, but it is generally on the order of 0.1 to 1.0 gram per liter of medium.

During the fermentation process, it may be desirable to add antifoaming agents, such as silicones, glyceride oils and the like. These compounds are added from time to time and in the amounts needed.

In the process of the present invention using shaker tubes, the 10 ml. batches of inoculated medium in 100 ml. shaker tubes are usually incubated for a period of about 20 to 50 hours at a temperature of about 28° C. At this point, 2 mgm. of sterile substrate (non-halo steroid) dissolved in 0.2 ml. of methanol is added to each tube and the fermentation continued at about 28° C. The fermentation is allowed to proceed for a period of time long enough to achieve maximum conversion of the non-halo steroid to the 6β-hydroxyl-non-halo steroid. This period of time may vary from 1 to 144 hours or longer.

At the conclusion of the fermentation process, the desired 6β-hydroxyl-non-halo steroid of the pregnane series is recovered from the fermentation medium by the following procedure which describes in particular a 10 ml. fermentation. This is a general procedure and is operative for fermentations of various sizes.

The contents of a fermentation tube are extracted with three volumes of ethyl acetate. The extracts are pooled and the resulting solution evaporated to dryness under reduced pressure. The dried residue is dissolved in a mixture consisting of a 1:1 ratio of water, saturated ethyl acetate and methanol. This solution is used for characterization of steroid content as described hereinafter.

In large-scale fermentations, the crude product or products may be recovered from the fermentation beer by simple solvent extraction, using a suitable water-immiscible solvent, such as chlorinated lower hydrocarbons, alcohols, esters, ketones and so forth. Further purification and separation of steroid products from extracts may be accomplished by methods well understood by those skilled in the art. Separation and purification of steroid mixtures often require the use of chromatography, as described hereinafter in the examples.

The primary advantage of the 6β-hydroxylation process of this invention lies in the wide range of substrates susceptible to 6β-hydroxylation by Mortierella. This is a departure from the rather limited substrate range of previously known microbiological methods of 6β-hydroxylation. Thus the use of the Mortierella process is a more general method of preparation of 6β-hydroxy compounds. 6β-hydroxylation by Mortierella can be effected not only upon steroids such as progesterone, desoxycorticosterone and Reichstein's S. but also very effectively upon highly oxygenated steroids such as the active glucocorticoid, hydrocortisone. It is in the range of the highly oxygenated steroids, which are the more interesting and active compounds that previously known microbiological 6β-hydroxylation processes fail.

The utility of 6β-hydroxylated steroids stems from the fact that introduction of a 6β-hydroxyl appears to be a detoxification mechanism. Thus 6β-hydroxy steroids may retain activity yet show a reduction in undesirable side effects. The present steroids are also useful as intermediates, for example, the use of 6β-hydroxy steroids as an intermediate for the preparation of the corresponding 6-methyl steroids is known. The latter compounds have glucocorticoid activity.

The following examples describe in detail the preparation of 6β-hydroxy-non-halo steroids of the pregnane series using species of the genus Mortierella.

*Example 1*

One hundred ml. of fermentation medium consisting of 2% molasses, 1% corn steep liquor and 1% corn starch adjusted to pH 7.0 with sodium hydroxide is prepared in a 500 ml. flask and inoculated with *Mortierella zonata* (ATCC No. 13,309) from potato dextrose agar slants. The flasks were shaken on a reciprocating shaker for 72 hours at 28° C. The growth obtained therefrom is used as inoculum for the steroid fermentation. Inoculum at the 5% level is made into a series of flasks containing 100 ml. of medium described above and incubated as described above. Twenty-four hours after inoculation, 20 mg. of steroid dissolved in 1 ml. of methanol is added to each flask. The steroids used are: 4-pregnene-3,20-dione; 11α-hydroxy-4-pregnene-3,20-dione; 17α,21-dihydroxy-4-pregnene-3,20-dione and 11β,17α,21-trihydroxy-4-pregnene-3,20-dione. Incubation is continued as above and samples are removed periodically for paper chromatographic assay. In most cases the 6β-hydroxy product is run in the same chromatographic jar to provide a reference point for the identification of the products formed. In addition to identity of mobility with the reference product, an additional specific reaction for 6β-hydroxy steroids is used to identify the product formed as the 6β-hydroxy derivative of the specific substrate used in each case. When steroids are sprayed with the mixture consisting of 0.1 M p-phenylenediamine and 0.1 M phthalic acid dissolved in absolute alcohol followed by heating at 105° C. for 3 minutes, only those steroids containing a 6β-hydroxyl group develop a distinct orange color immediately. Thus it is evident that the 6β-hydroxy derivative is formed in each instance. The time required for maximum yield of 6β-hydroxy product varied with the steroid used and ranges from 4–144 hours.

*Example 2*

A twenty-four liter quantity of fermentation medium consisting of 2% molasses, 1% corn steep liquor, and 1% corn starch is prepared and inoculated with *Mortierella zonata*. Six grams of the substrate hydrocortisone dissolved in 240 ml. of methanol is added and the fermentation continued for about 125 hours. The mash is filtered with the aid of diatomaceous earth yielding 21 liters of beer. The mash cake is extracted twice using 21 liters of ethyl acetate and the extracted cake discarded ketone. The beer is extracted twice using 21 liters of ethyl acetate for each extraction. The three extracts are pooled and concentrated to a residue under reduced pressure yielding 3.31 g. of crystals. The crystals are chromatographed on a 650 g. diatomaceous earth column using a system consisting of 1 volume of water, 5 volumes of dioxane and 2 volumes of cyclohexane. At a holdback volume of 3.2 liters, a peak is obtained which when concentrated to dryness and recrystallized twice from acetone-ether gives 325 mg. of pure 6β,11β,17α,21-tetrahydroxy-4-pregnene-3,20-dione.

*Example 3*

In a process similar to that of Example 1 except that of Example 1 except that *Mortierella pusilla* is used in place of *Mortierella zonata*. The product obtained is 6β-hydroxy-4-pregnene-3,20-dione.

*Example 4*

An experiment is carried out similar to Example 1 except that 4-pregnene-3,20-dione is replaced with 11α-hydroxy-4-pregnene-3,20-dione. The product obtained is 6β,11α-dihydroxy-4-pregnene-3,20-dione.

*Example 5*

Following the procedure of Example 2 and substituting *Mortierella polycephala* in place of *Mortierella zonata*. The product obtained is 6β-hydroxy hydrocortisone which is identical with the same product prepared by a different method.

Example 6

Using the process outlined in Example 1 and substituting *Mortierella alpina* in place of *Mortierella zonata*, the product 6β-hydroxy-4-pregnene-3,20-dione is obtained.

Example 7

In a process as outlined in Example 1 in which *Mortierella tuberosa*, *Mortierella isobellina*, *Mortierella bainieri* and *Mortierella marburgensis* are substituted for *Mortierella zonata*. The product obtained is 6β-hydroxy-4-pregnene-3,20-dione.

We claim:
1. A process of hydroxylating non-halo steroids of the pregnane series in the 6β-position which comprises the step of subjecting said non-halo steroid of the pregnane series of the fermentative action of a fungus of the genus Mortierella selected from the group consisting of *M. bainieri*, *M. polycephala*, *M. alpina*, *M. tuberosa*, *M. pusilla*, *M. simplex*, *M. marburgensis*, *M. isobellina* and *M. zonata*.

2. A process which comprises the step of subjecting hydrocortisone to the fermentative enzymatic action of fungi of the genus Mortierella selected from the group consisting of *M. bainieri*, *M. polycephala*, *M. alpina*, *M. tuberosa*, *M. pusilla*, *M. simplex*, *M. marburgensis*, *M. isobellina* and *M. zonata* and recovering therefrom 6β-hydroxy hydrocortisone.

3. A process of preparing compounds having the formula:

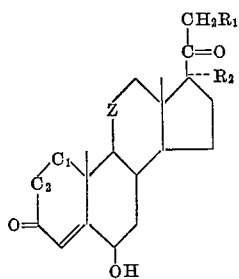

in which —C₁—C₂— is a divalent radical selected from the group consisting of —CH₂—CH₂ and —CH=CH— groups, Z is selected from the group consisting of H₂C<, O=C< and

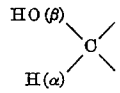

radicals and R₁ and R₂ are selected from the group consisting of hydrogen, hydroxyl and lower alkanoyloxy groups which comprises subjecting the corresponding 6-deoxy steroid to the fermentative enzymatic action of fungi of the genus Mortierella selected from the group consisting of *M. bainieri*, *M. polycephala*, *M. alpina*, *M. tuberosa*, *M. pusilla*, *M. simplex*, *M. marburgensis*, *M. isobellina* and *M. zonata* and recovering said compounds therefrom.

4. A process which comprises the step of inoculating the nutrient medium with the fungus *Mortierella zonata* and adding hydrocortisone permitting fermentation to proceed until a substantial amount of 6β-hydroxy hydrocortisone has been produced and recovering said product therefrom.

5. A process which comprises the step of inoculating a nutrient medium with the fungus *Mortierella polycephala* and adding hydrocortisone permitting the fermentation to proceed until a substantial amount of 6β-hydroxy hydrocortisone is produced and recovering said compound therefrom.

6. A method which comprises the step of subjecting 4-pregnene-3,20-dione to the enzymatic action of the fungus *Mortierella pusilla* and recovering therefrom 6β-hydroxy-4-pregnene-3,20-dione.

7. A process which comprises the step of subjecting hydrocortisone to the enzymatic action of the fungus *Mortierella polysephala* and recovering therefrom 6β-hydroxy hydrocortisone.

8. A process which comprises the step of subjecting 4-pregnene-3,20-dione to the enzymatic action of the fungus *Mortierella alpina* and recovering therefrom 6β-hydroxy-4-pregnene-3,20-dione.

References Cited in the file of this patent
UNITED STATES PATENTS
2,602,769    Murray et al. ------------ July 8, 1952